J. GRISCOM.
Compressed Air Motors for Vehicles.

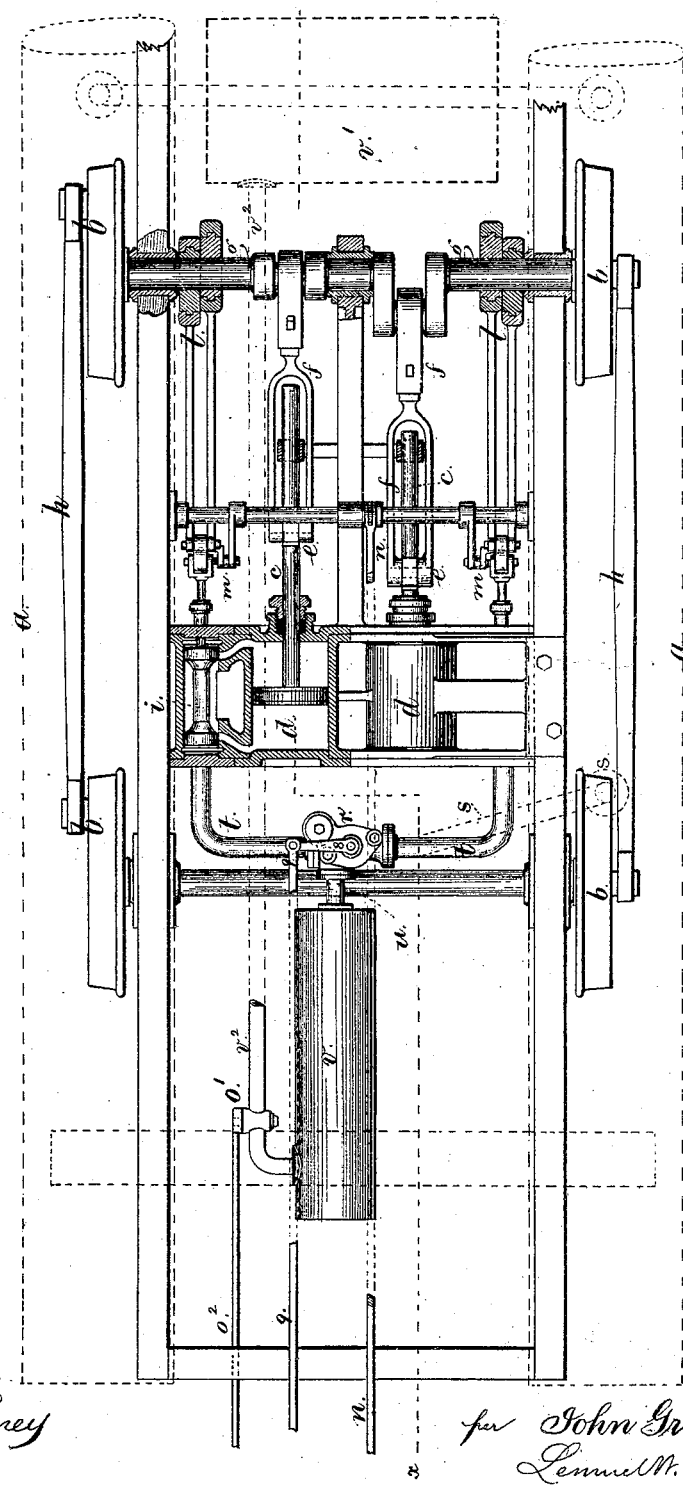

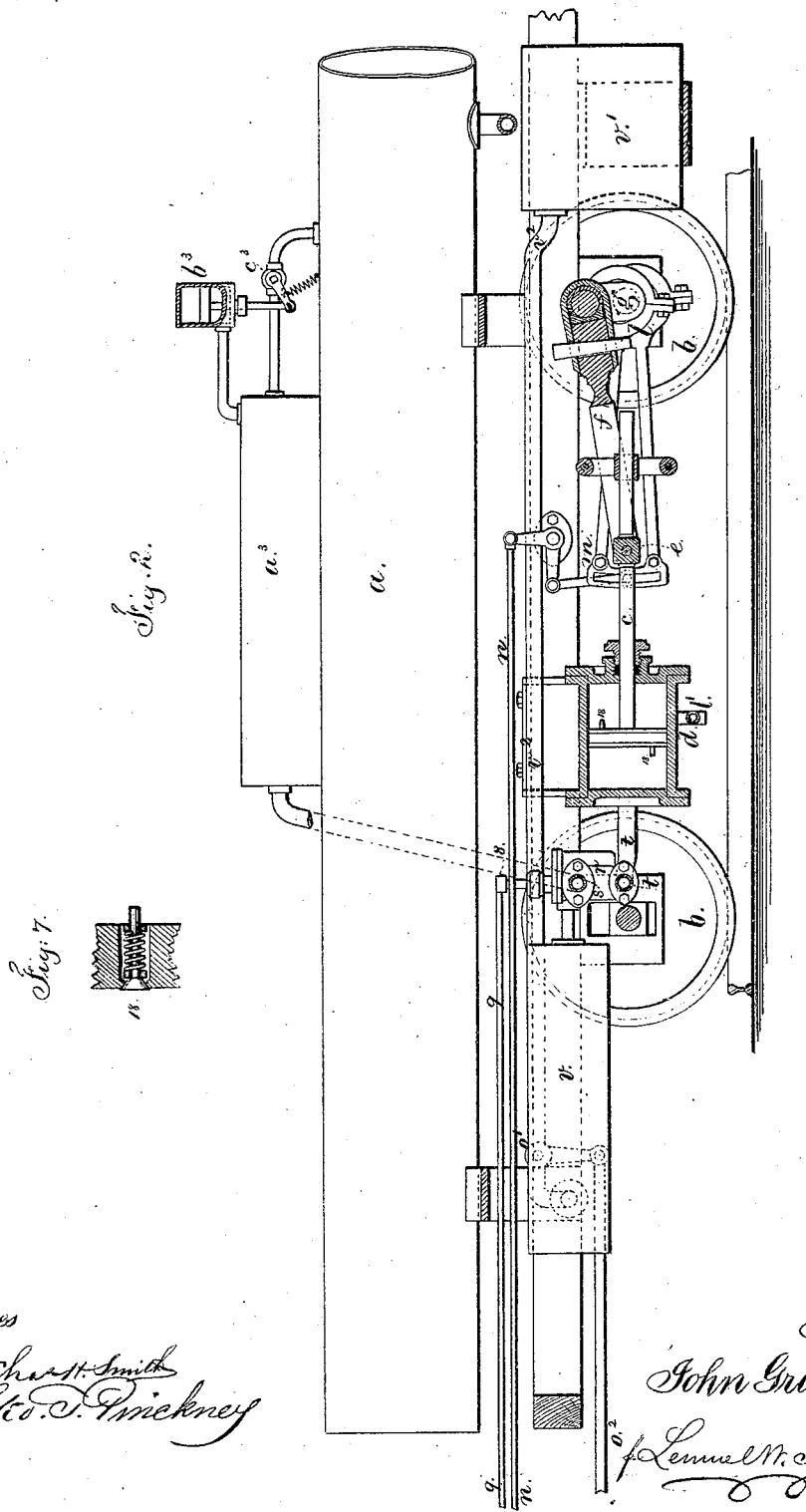

No. 152,285.  Patented June 23, 1874.

Witnesses
Chas. H. Smith
Geo. T. Pinckney

Inventor
John Griscom
per Lemuel W. Serrell
atty.

UNITED STATES PATENT OFFICE.

JOHN GRISCOM, OF NEW YORK, N. Y.

IMPROVEMENT IN COMPRESSED-AIR MOTORS FOR VEHICLES.

Specification forming part of Letters Patent No. 152,285, dated June 23, 1874; application filed April 9, 1874.

*To all whom it may concern:*

Be it known that I, JOHN GRISCOM, of the city and State of New York, have invented an Improvement in Compressed-Air Motors for Vehicles, of which the following is a specification:

Air-engines, operated by atmosphere under compression in tanks, have been employed in propelling vehicles, and an air-pump has been used to force atmospheric air into a reservoir, said pump being brought into action as a brake in stopping the car, so as to employ the inertia of a car to produce a store of expansible atmosphere to operate in the same pump to aid in starting the car, and thereby relieve the horses or engine of considerable strain in overcoming the inertia.

My invention is made for combining a compressed-air motor with a brake-engine, so that the inertia of the car or other vehicle is availed of to effect a saving of the air that is stored in the tanks by making the same engine act as a pump to compress air into a vessel and stop the engine and car or other vehicle, thus overcoming the inertia, and the same compressed air is used to start the car or other vehicle. While the vehicle is passing over a slight descending grade the engine is allowed to run without using air from the tanks, and when the grade is sufficiently steep the inertia is availed of to pump atmosphere into a tank, and, in so doing, to accumulate a supply that is available in propelling the car or other vehicle on a level or ascending grade.

By my improvements the use of a brake upon the wheels is dispensed with, and there is great economy effected in the use of the compressed air in the main tanks by using the inertia of the car or other vehicle to pump a supply into the secondary tank.

Figure 4:
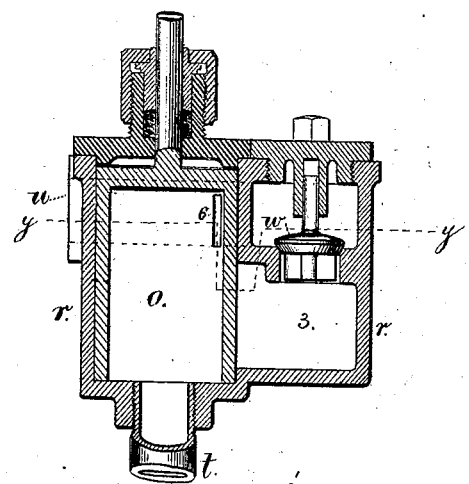
Figure 3:
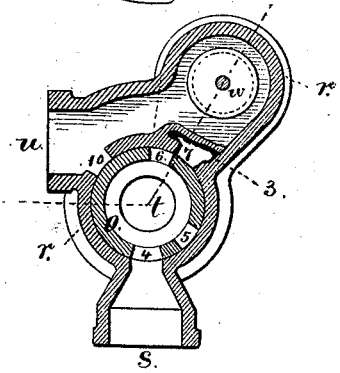
Figure 5:
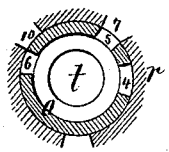
Figure 8:
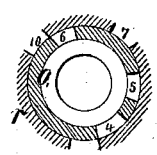

In the drawing, Figure 1 is a plan of the mechanism employed by me, one of the engine-cylinders being in section. Fig. 2 is a section vertically at the line $x\ x$. Fig. 3 is a sectional plan of the valve employed between the air-pipes and engine at the line $y\ y$ of Fig. 4, which is a vertical section of the said valve; and Figs. 5, 6, and 8 show the valve in different positions.

The tanks $a\ a$ are of suitable size or character, (they will usually be placed under the car-seats,) and $b\ b$ are the wheels of a railway-car or other vehicle. The piston-rods $c$ of the engine-cylinders $d\ d$ are connected, by the cross-heads $e$, with the pitmen $f$, to the cranks of the axle $g$, and when there is sufficient distance between the axles for the connections to be made from both ends of the cylinders the same may be so arranged; otherwise it is preferable to have the outside connections $h$ between crank-pins upon the wheels, as represented. I prefer and use piston-valves $i\ i$, operated by the eccentrics $l$, and there is a link-motion, $m$, to each pair of eccentrics and valve, the same being operated by the connecting-rod $n$ to a lever at the front of the car under control of the engineer or driver. When the slotted link is midway between the points of connection of the eccentric-rods the valves will not be moved, but the engine-pistons can move back and forth in vacuum or against the confined air. When the link is lowered the valve will be worked to admit air under pressure to drive the engine, and it is positioned so as to cut off the supply at any desired point. When the links are raised the valves are operated by the other pair of eccentrics, and the engines continue to move in the same direction by the inertia of the car or other vehicle; then the cylinders and pistons are made to act as pumps and force the air out of the cylinders. These connections, being of a known character, do not require further description. The valve is made of a three-way cylinder or cone, $o$, within a case, $r$, to which the pipe $s$ is connected from the storage-tanks $a$, (shown by dotted lines in Fig. 1.) The pipe $t$ to the engine-cylinders is connected at the end of such case, and on one side is a connection, $u$, to the secondary tank $v$. There is a check-valve, $w$, in the pipe $u$, and a chamber, 3, below it, with an opening through a division in the case $r$. The cylinder $o$ has the three openings 4, 5, and 6 formed by slots through such cylinder, and the valve-cylinder $o$ is moved by the arm 8 and rod 9 to a lever under the control of the engineer or driver. When the valve $o$ is in the position shown in Figs. 3 and 4, the atmospheric air under pressure is free to pass, by the pipe $s$, through the slot 4 to the engine by the pipe $t$.

If the engine-links are reversed so that the engines act as pumps, the atmosphere will be drawn in through the usual discharge-pipe $l'$ and forced into the chamber 3 through the ports 5 and 7, so as to lift the check-valve $w$ and pass to the secondary tank $v$, and the pressure will accumulate therein until sufficient to stop the pumps and car, thereby acting as brakes; but if this is not desired, and the cylinders continue to act as pumps while running upon a descending grade, the engineer or driver, by a lever or treadle and rod, $o^2$, opens the valve or cock $o^1$ more or less to allow the surplus atmospheric air to pass by the pipe $v^2$ into the secondary storage-tank $v^1$, that is of a capacity to contain the amount that will be pumped into the same in running on the longest down-grades.

Figure 6:
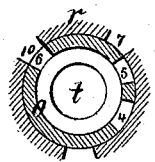

Upon commencing an ascending grade, or when the car is being started after being stopped, the lever and valve $o$ are placed in the intermediate position shown in Fig. 6, so that the compressed atmospheric air in the secondary tank $v$, or secondary storage-tank $v'$, will pass through the slits or ports 10 and 6, and pipe $t$, to the engine, and when that source of motive power is exhausted, then the further movement of the valve $o$ will close both ports 10 and 7, and open the supply from the main storage-tanks $a$. By this means the air in the main storage-tanks will only be used when the supply that has been accumulated by pumping has been exhausted.

When the valve $o$ is turned to the position shown in Fig. 8, the outlets are all closed; hence the engine-pistons will work against the atmosphere that is contained in the pipes and passages, and this will act as a slight check to the velocity; but if the link-motions are reversed while the valve $o$ is in this position, the air will be pumped in and compressed in such a small space that the accumulation of pressure will be sufficiently-sudden to stop the car almost instantly.

To prevent too great accumulation of pressure in the air-cylinders by the movement of the piston with the ports closed, I make use of check-valves 18, as seen in Figs. 2 and 7, that are placed in holes passing through the pistons, and the valves open in opposite directions by contact of the stems with the inner sides of the heads of the cylinders, when the pistons have approached so near to the heads that the pressure would be too great.

I make use of a regulating-vessel, $a^3$, between the storage-tanks $a$ and the pipe $s$ to the engine, and to this is connected a cylinder, $b^3$, and piston that operates the cock or valve $c^3$, leading to the tank, the reverse movement being given by a spring, so that when the pressure in the regulator $a^3$ accumulates, the valve $c^3$ will be closed by the piston, and, as it lessens, the valve will be opened by the spring, thereby maintaining great uniformity of operative pressure upon the engine.

The pressure at which the air is admitted to the cylinder, and the time that the valve remains open, are to be such that the air will expand to about the ordinary pressure of the atmosphere; hence it will escape without noise, and there will not be loss of power from the expansion of the air outside the cylinder. It will be necessary, however, to have the cylinders of sufficient size to obtain the required power for propelling the car upon the steepest grades.

By proportioning the parts in this manner, the motor is adapted to act as a pump to compress the air in a ratio corresponding to that of the expansion, and in so doing the pressure accumulated in stopping in a certain distance will be expended in starting the car and moving it nearly the same distance.

I claim as my invention—

1. A secondary tank, in combination with the engine and compressed-air tank, of a motor for cars, and valves or cocks and connecting-pipes, whereby the engine is made to operate as a pump to force atmosphere into the secondary tank, substantially as set forth.

2. A secondary storage-tank, $v'$, combined with the secondary tank $v$, an intermediate cock or valve, and the compressed-air motor and reversing mechanism, substantially as set forth.

3. The cock or valve $o$, and ports 4, 5, 6, 7, 8, and 10, connecting the pipe $s$ from the storage-tank $a$, the pipe $u$ to the secondary tank $v$, and the pipe $t$ to the motor, in combination with the check-valve $w$, the parts being arranged and operating substantially as set forth.

4. The combination, with a pump to compress air in stopping a car, of two or more chambers of varying capacity, and valves or cocks, substantially as set forth, whereby the accumulated pressure of air will be sufficient to stop the car more or less suddenly, according to the capacity of the chamber into which the air is forced, substantially as set forth.

Signed by me this 1st day of April, A. D. 1874.

JOHN GRISCOM.

Witnesses:
  GEO. T. PINCKNEY,
  CHAS. H. SMITH.